US010032120B2

(12) United States Patent
Collins et al.

(10) Patent No.: US 10,032,120 B2
(45) Date of Patent: Jul. 24, 2018

(54) METHOD AND APPARATUS FOR WORKFORCE MANAGEMENT

(75) Inventors: Timothy J. Collins, Homer Glen, IL (US); Eric R. Buhrke, Clarendon Hills, IL (US); Noel S. Massey, Carpentersville, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 620 days.

(21) Appl. No.: 12/892,824

(22) Filed: Sep. 28, 2010

(65) Prior Publication Data

US 2012/0078388 A1    Mar. 29, 2012

(51) Int. Cl.
*G06Q 10/06*    (2012.01)

(52) U.S. Cl.
CPC .................... *G06Q 10/06* (2013.01)

(58) Field of Classification Search
USPC ............................... 705/7.11–7.42
See application file for complete search history.

(56) References Cited

U.S. PATENT DOCUMENTS

| | | | | |
|---|---|---|---|---|
| 6,952,680 B1* | 10/2005 | Melby | ............... | G06Q 10/04 705/28 |
| 7,319,908 B2 | 1/2008 | Sinclair et al. | | |
| 7,467,353 B2 | 12/2008 | Kurlander et al. | | |
| 7,834,759 B2* | 11/2010 | Charlier | ............... | A61B 5/00 250/372 |
| 9,020,831 B2* | 4/2015 | Simske | ............. | G06F 17/30893 705/7.27 |
| 2003/0195825 A1* | 10/2003 | Ehrman | ................. | G06Q 10/00 705/28 |
| 2003/0216976 A1* | 11/2003 | Ehrman | ................. | G06Q 10/00 705/28 |
| 2003/0225707 A1* | 12/2003 | Ehrman | ................. | G06Q 10/08 705/64 |
| 2003/0236691 A1* | 12/2003 | Casatl | ............. | G06Q 10/06312 705/7.27 |
| 2004/0015419 A1* | 1/2004 | Ehrman | ................. | G06Q 10/00 705/28 |
| 2006/0290519 A1* | 12/2006 | Boate | ................. | G07C 9/00111 340/573.4 |
| 2007/0229251 A1* | 10/2007 | Ehrman | ................. | G06Q 10/08 340/539.1 |
| 2007/0239292 A1* | 10/2007 | Ehrman | ................. | G06Q 10/08 700/83 |
| 2007/0239324 A1* | 10/2007 | Ehrman | ................. | G06Q 10/08 701/2 |
| 2007/0290840 A1* | 12/2007 | Ehrman | ................. | G06Q 10/00 340/539.13 |
| 2008/0015955 A1* | 1/2008 | Ehrman | ................. | G06Q 10/06 705/28 |
| 2008/0086509 A1* | 4/2008 | Wallace | ................. | G06Q 10/10 |

(Continued)

*Primary Examiner* — Jeff Zimmerman

(57) ABSTRACT

A communication system for workforce management is formed of a system controller managing a plurality of badges associated with workplace devices and employees within the workplace. The controller receives event indicators from the badges. These event indicators are analyzed by the controller to determine whether a task should be created and performed by at least one of the workplace devices and/or at least one of the employees. Task lists and device assignments are dynamically updated in response to current workplace conditions.

18 Claims, 5 Drawing Sheets

(56) References Cited

U.S. PATENT DOCUMENTS

| | | | | |
|---|---|---|---|---|
| 2008/0089254 A1* | 4/2008 | Graves | | H04W 8/22 370/310 |
| 2008/0136584 A1* | 6/2008 | Ehrman | | G06Q 10/08 340/5.2 |
| 2008/0140440 A1* | 6/2008 | Ehrman | | G06Q 10/08 705/28 |
| 2008/0140482 A1* | 6/2008 | Ehrman | | G06Q 10/08 701/2 |
| 2008/0140483 A1* | 6/2008 | Ehrman | | G06Q 10/08 705/7.22 |
| 2008/0140544 A1* | 6/2008 | Ehrman | | G06Q 10/08 705/28 |
| 2008/0154712 A1* | 6/2008 | Wellman | | G05D 1/0282 235/384 |
| 2009/0053999 A1* | 2/2009 | Shoemake | | H04W 92/02 455/62 |
| 2009/0089107 A1* | 4/2009 | Angell | | G06Q 10/00 705/7.28 |
| 2009/0089108 A1* | 4/2009 | Angell | | G06Q 10/00 705/7.28 |
| 2009/0099897 A1* | 4/2009 | Ehrman | | G06Q 10/06 705/7.15 |
| 2009/0135003 A1* | 5/2009 | Charlier | | A61B 5/00 340/539.13 |
| 2009/0181702 A1 | 7/2009 | Vargas et al. | | |
| 2009/0193080 A1* | 7/2009 | Toscano | | H04W 4/02 709/204 |
| 2009/0216438 A1 | 8/2009 | Shafer | | |
| 2009/0309730 A1* | 12/2009 | Kothari | | G03G 21/1657 340/572.1 |
| 2010/0153146 A1* | 6/2010 | Angell | | G06Q 10/0635 705/7.28 |
| 2010/0153147 A1* | 6/2010 | Angell | | G06Q 10/04 705/7.28 |

* cited by examiner

METHOD AND APPARATUS FOR WORKFORCE MANAGEMENT

FIELD OF THE DISCLOSURE

The present disclosure relates generally to communication systems and more particularly to the management of electronic and non-electronic devices and functions within the workforce.

BACKGROUND

Electronic devices play an ever increasing role within the workforce environment. Companies, both large and small, as well as health care providers, such as doctors' offices and hospitals, need to be able to manage personnel and electronic resources in an efficient and timely manner. As staff size is often reduced, many employees find themselves handling a variety of different tasks utilizing several different devices throughout the day. In the retail environment for example, electronic devices such as bar code scanners, printers, copy machines, cash registers and the like all play a role in day-to-day operations, but these devices also incur cost in terms of maintenance, battery power usage, and employee task time. At any given time an employee may be looking to use one or more of these devices only to find that some resource associated with the device is lacking. For example, a battery operated device may need charging or a copier device may be low on toner or may have run out of paper. All of these types of scenarios cost time and money within the workforce environment.

Accordingly, it would be desirable to efficiently manage devices within a workforce environment. Improving the management of such devices in concert with the efficient management of task assignments to employees will allow for organizations to optimize their workforce.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
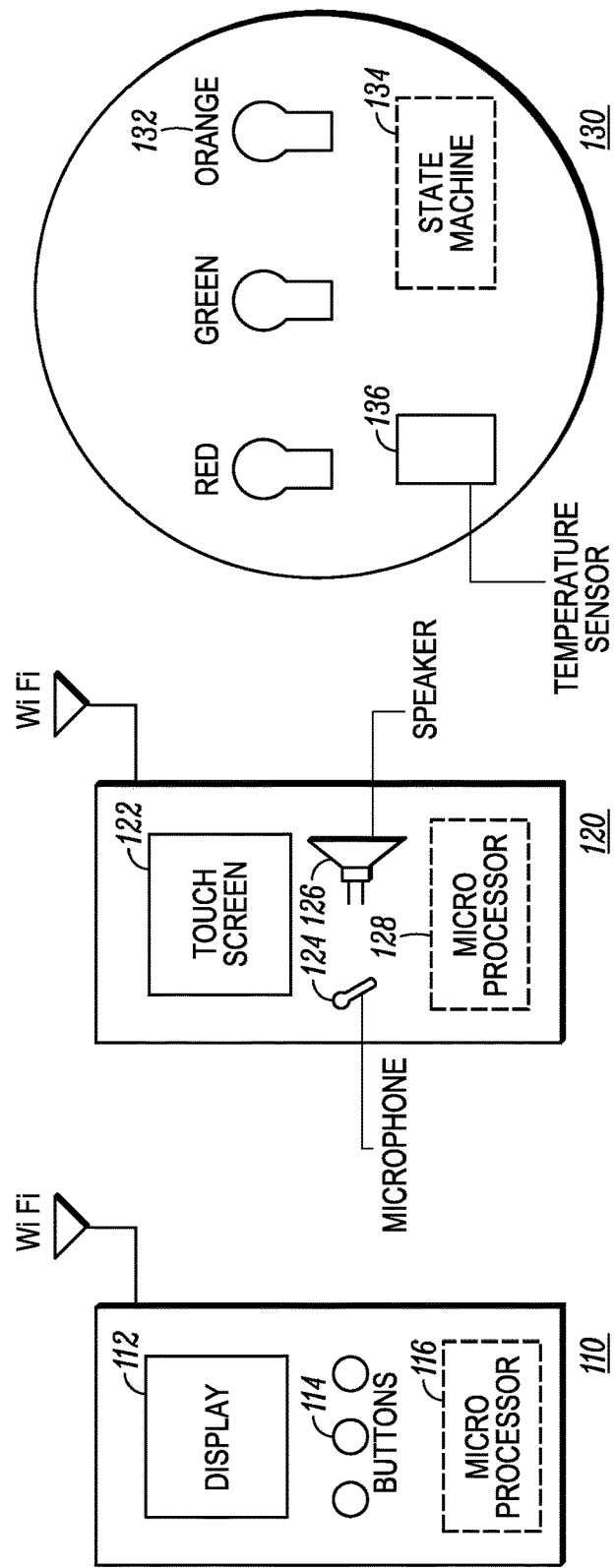
FIG. 1 is a block diagram of electronic badges for use in a workforce management communication system accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is described herein a resource management technique and communication system which facilitate workforce management through real time monitoring of electronic device capabilities and dynamic modification of employee task assignment. The communication system includes a system controller or server which monitors a plurality of electronic badges distributed within a workforce environment, such as a store or office. Each electronic badge is an electronic device that may be associated with some other electronic or non-electronic object located and performing functions within the workforce environment. Each badge is capable of providing a resource status report of itself and/or a status report pertaining to one or more functions of its associated object. The system controller, operating in conjunction with the badges, monitors the devices throughout the workplace and assigns or re-assigns tasks to the devices and employees using these devices for optimizing a goal such as maximizing the number of tasks accomplished, extending device lifetime, or employee efficiency.

FIG. 1 is a block diagram of electronic badges 110, 120, 130 for use in a workforce management communication system in accordance with various embodiments the invention. Badge 110 includes a display 112 and user interface buttons 114 under the control of microprocessor 116. Badge 120 includes a touch screen 122, a microphone 124, and a speaker 126 under the control of microprocessor 128. Badges 110 and 120 are shown as WiFi devices, however other communications interface may be suitable as well. Badge 130 includes different colored LEDs 132 and a sensor 136, such as a temperature sensor, under the control of a state machine 134. The badges 110, 120, 130 operate under the control of a backend controller to be described in FIG. 2. Some badges, such as badges 110, 120 are implemented with sufficient processing power and software to communicate with another device and make a decision without human intervention such to control a second device as long as the system controller has granted permission for it to do so. Other badges, for example badge 130, may be able to just report data. Hence, some badges have the power to make decisions while other badges do not. The more intelligent badges may consume more power but be capable of making decisions on their own if the controller allows the badge to make a decision. The various embodiments of badges will depend on the type of device to which each is associated. A workplace environment may thus incorporate one or more badge types depending on the devices being managed. Additionally, workplace resources being used by a particular device, or within proximity of a badge/device, may include such resources as paper, battery life, temperature, humidity, noise, pollution, motion, RF noise, energy usage (gas, coal, wind) to name a few. Badges can be embodied with various sensors depending on the device and resource being measured.

Figure 2:
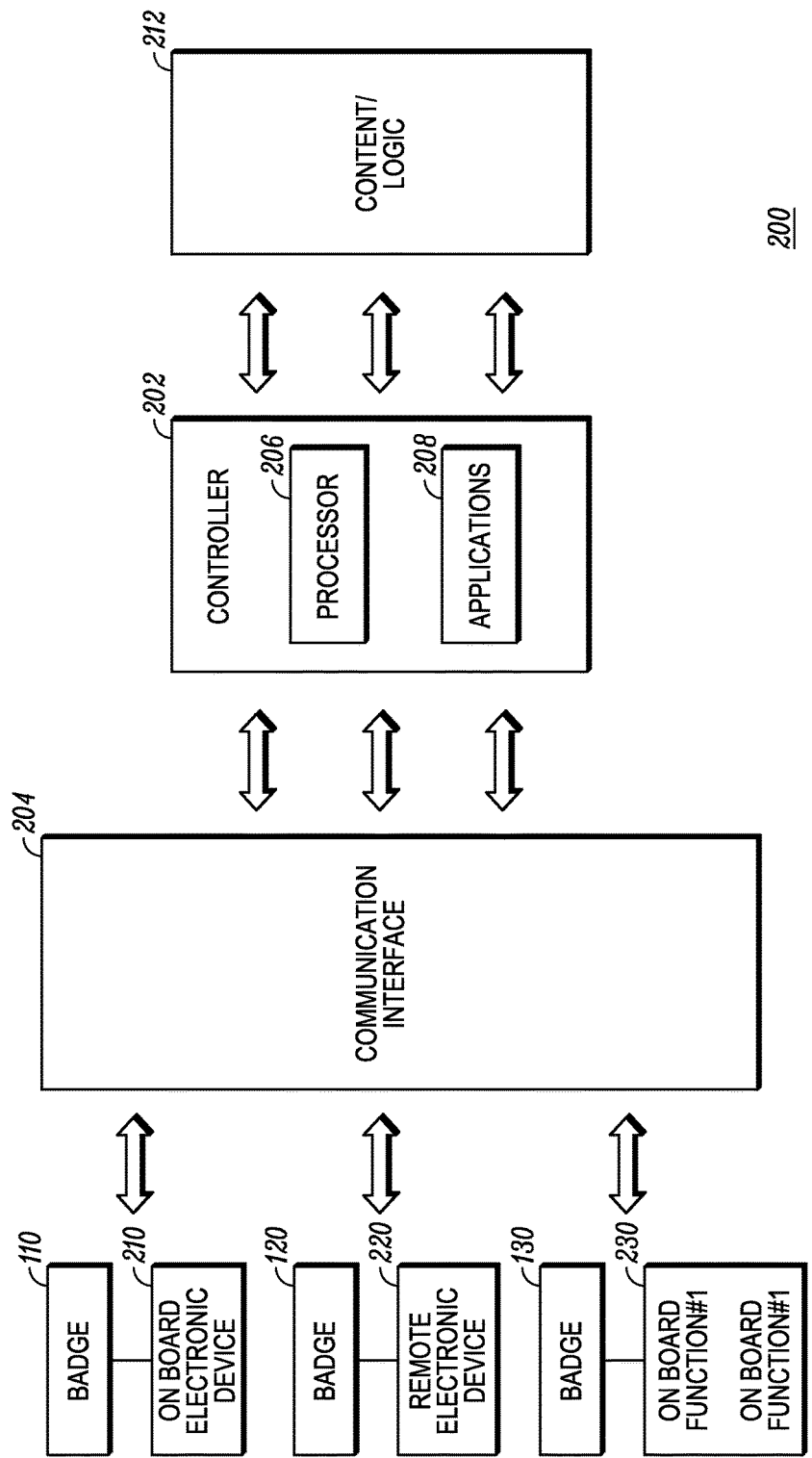
FIG. 2 is a block diagram of a workforce management communication system in accordance with an embodiment of the invention.

FIG. 2 is a block diagram of a communication system 200 for workforce management in accordance with an embodiment of the invention. Communication system 200 comprises a controller 202 for directing the plurality of badges 110, 120, 130 within the workplace. Each badge of the plurality of badges 110, 120, 130 is associated with one or more electronic or non-electronic devices 210, 220, 230. The controller includes a translator function which converts incoming and outgoing data into a format which the badges 110, 120, 130 can interpret and execute. The controller 202 determines what functions the devices should be executing based on requests sent from the badges 110, 120, 130 to the controller or from inquiries sent to the badges from the controller to facilitate workforce management. As described in FIG. 1, the badges may be configured to provide resource status reports, indicator alerts and query functions. The resource status reports may include such parameters as the current availability of the electronic device or the current state of resources used within or surrounding the device. For example ink, paper, battery life, temperature, humidity, noise, pollution, motion, RF noise, energy usage (gas, coal, wind) are just a few examples of such workplace resources.

As a practical example, at the beginning of a work day, the system controller 202 can assign one or more devices in accordance with an employee task list. The task list can be generated by a person (manager) or an electronic sensor, for example an RFID system. The task list may include for example, stocking and re-stocking tasks related to time of day, day of the week, day of the year, weather conditions etc. For example, tasks relating to stocking of holiday inventory might occur on specific dates. Each badge of the plurality of badges 110, 120, 130 is assigned to a device and an employee is tasked in response to the task list. Badges operating within the communication system 200 may be embodied in variety of ways. For example, a request may be sent to controller 202 by entering button presses 114 at badge 110. The controller 202 may send an alert to an employee via the display 112 of badge 110. For badges incorporating a microphone/speaker 124, 126 such as badge 120, the badge may sound an alert. Likewise, the controller 202 can alert an employee via an audio tone at the badge 120. The minimalist badge, badge 130, utilizes the state machine 134, which can turn LEDs 132 of different colors on and off in response to temperature sensor 136. The controller 202 may monitor cameras set up within the workplace and turn on/off devices within the workplace in response to the LED indicators of badge 130.

Each badge of the plurality of badges 110, 120, 130 is associated with one or more electronic or non-electronic devices 210, 220, 230. In accordance with the various embodiments, each badge provides resource status information associated with its respective device. The association between the badges 110, 120, 130 and their respective devices 210, 220, 230 may be implemented in a number of ways such as coupled wirelessly or wired using standard communication protocols for the electronic devices or proximate/physical coupling for non-electronic devices.

The devices 210, 220, 230 represent a variety of device types that are used within a workforce environment. Such devices might include, for example, bar code scanners, printers, laptops, cash registers, manufacturing equipment to name a few. For the purposes of illustration, badge 110 is shown associated with an on-board device 210. For example, badge 110 might be coupled directly to a handheld scanner, credit card reader, keypad or other device typically carried by an employee. Badge 120 is shown associated with a remote electronic device 220. For the purposes of this example, the remote electronic device 220 is considered a non-handheld device used in the workplace, such as a copy machine, a kiosk with barcode scanner, a temperature controlled device, or manufacturing equipment control to name a few. Badge 130 is shown coupled to a device 230 having a plurality of functions. For example, device 230 might be embodied as a copier having multiple functions including copying, scanning and faxing capabilities. Thus, the badges 110, 120, 130 operating in accordance with the various embodiments can interface with many different types of devices used within a workforce environment.

In accordance with an embodiment, system controller 202 communicates with the plurality of badges 110, 120, 130 via a communication interface 204. The badges may be mobile badges or fixed-location badges. The communication interface 204 may be embodied by one or more interfaces, for example via WiFi, GSM, Bluetooth, CDMA, WiMAX, or CAT5 interfaces to name a few. Controller 202 includes a processor 206 and applications 208 stored therein. The applications 208 include workforce management and operation applications pertaining to device tasks, employee tasks, and monitoring/analytical applications. For example, a voice application may instruct an employee at the start of his shift to take inventory, or an RFID application may have a scheduled 'take inventory' automatic task that happens at a predetermined time. As such, the workforce applications may include for example, a task management application, speech/text conversion applications, location determination applications, video searching capability, to name a few.

In accordance with the various embodiments, the processor 206 is configured to send, via the communications interface 204, a command to at least one of the badges 110, 120, 130 requesting a resource status update. The resource status update request may be sent in accordance with one or more of the applications 208. The communications interface 204 in turn, receives resource-status reports from the queried badge or badges and passes these back to the system controller 202. Based, at least in part, on the received resource-status reports, the controller 202 sends a counter-command to the badge or badges. The counter-command instructs a device or an employee to perform a task. The counter-command might disable a device or provide an instruction to disable the device, or the counter command might instruct a user of a device associated with a first badge to move to a specified location, and instruct the user of the first badge to accomplish the first command by using a second electronic device rather than the first electronic device. The number of tasks or the types of tasks assigned to the employee and electronic device can be managed and varied over time, utilizing a task management application within the controller 202, in response to variations in the resource status reports provided by the badges. Examples of tasks may include for example, commands to close a valve, increase temperature, take inventory, scan an item to name a few.

The system controller 202 utilizes the processor 206 and applications 208 to determine what functions should be executed by the device(s) based on the resource status reports, alerts and requests received from the badges. The applications 208 can be modified and updated in response to content and logic inputs 212. The content and logic inputs 212 set up the controller 202 with information as to the types of current devices within the workforce environment, information pertaining to the addition or removal of devices from the system 200, the addition or removal of particular task assignments, and the addition or removal of workforce applications. The content and logic 212 also provides current work schedules and default task assignments for one or more employees. By having the controller 202 receive this type of back-end information from the content/logic 212, the badges 110, 120, 130 at least some of the badges may be able to be embodied as low power devices under the control of controller 202. The badges 110, 120, 130 generate indicator alerts, resource status reports and user requests for device and task changes which are interpreted by the controller. Likewise, the controller 202 responds to the requests, indicators and status reports by sending responses to the badge. The user of a device receives the indication on the badge and changes devices or job tasks accordance to predetermined optimization goals represented in the controller's operations application which will be described in conjunction with FIG. 3.

By having the system controller 202 determine what functions should be executed based on the number or type of tasks assigned to the devices in conjunction with the controller knowing the resource consumption for each device enables an employee utilizing the electronic device to complete a day's activities in an efficient manner. The various tasks performed throughout a workday may be accomplished by either: more than one person, more than one device, or more than one function on any given device. The communication system 200 manages all of these situations.

The system controller 202 knows how much power is consumed when an electronic device 210, 220, 230 performs its respective function(s). The power consumption is determined by the controller 202 from statistics the controller calculates over time for each electronic device. As process variations of the same electronic device can be expected, variations in performance (e.g. on time, battery life) may also be expected. Variations in performance may also be due to the user. For example, user "A" may take five times to scan a bottle of water, but user "B" may take only one time to scan the same bottle of water. The user's performance variation may be due to the skill level of the employee as well as the performance of the device. In system 200, the controller 202 is able to determine and track each electronic device's unique characteristics for each user as well as each device.

Additional examples include, the system controller 202 determining, based on a received resource status report from badge 110 that the battery life associated a particular handheld scanner (electronic device 210) will not be able to support sufficient scanning capability for the remainder of a work shift. The controller 202, knowing that certain tasks assigned to this scanner have not yet been completed and comparing this against remaining battery life, will prevent additional task assignments to this scanner. The controller 202 will also interpret deviations from assigned tasks. For example, additional scanning may have taken place using a particular scanner based on walk-up customers, and as such the scanner's available battery life may be lower than normally predicted. The controller 202 will adjust task assignments accordingly. The controller 202 directs the badge 110 to indicate that another scanner with more battery life is available. Battery life as well as product longevity, which are key criteria in workforce environments, can be thus remain optimized throughout the workday.

As another example for printer type devices, the controller 202 can determine, based on a status report received from badge 120, that the toner or paper supply consumption associated with a printer is low and direct the user to replenish the supplies, direct the user to another printer, or direct the user to another task. The controller may also determine that another employee has access to a suitable printer and reassign the current task to this other employee, all in accordance with the applications 208 configured by content/logic 212. The controller 202 is thus able to manage the various devices so as to improve resource usage, worker location, and/or business goals such as minimizing equipment down time, minimizing out-of-stock items, and minimizing customer wait time. The improvement in resource allocation, task assignments, and timing efficiency provide for an overall improvement in the management of the workforce.

Figure 3A:
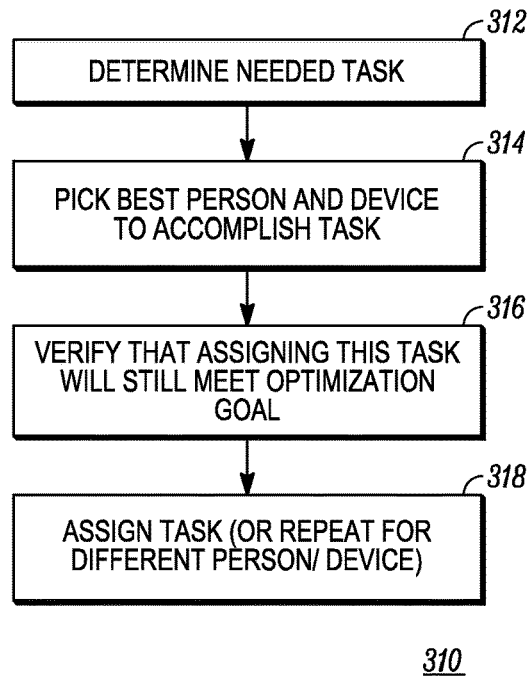
FIG. 3A and FIG. 3B are flowcharts summarizing resource management techniques used within the workforce management communication system in accordance with an embodiment of the invention.
Figure 3B:
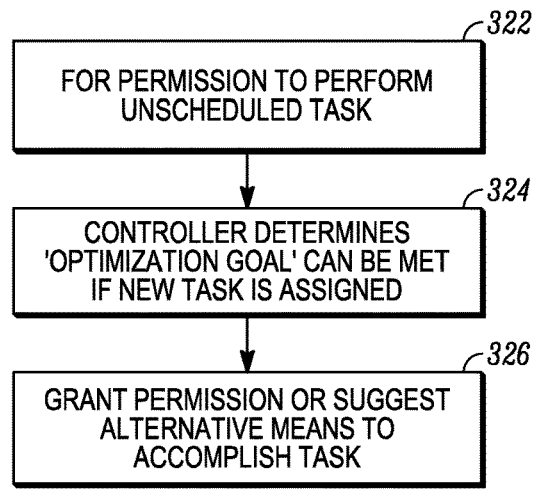

FIG. 3A and FIG. 3B are flowcharts summarizing resource management techniques 310, 320 used within the workforce management communication system in accordance with an embodiment of the invention. FIG. 3A covers an embodiment in which the system sends tasks to people and/or devices, while FIG. 3B covers an embodiment where the employee or device sends a request within the system. Beginning with technique 310, the system determines at 312 whether a task needs to be performed, for example in response to a badge sensor alert (e.g. RFID system or the like) or request sent from a person via a badge. The best person and device to accomplish the task is determined at 314. A verification is made at 316 that completing the newly assigned task still allows for known workforce optimization goals to be met. If it is determined that the goals can still be met, then the task is assigned and if the goals can not be met, then the request is repeated to a badge associated with another device or person at 318.

Referring to FIG. 3B, the employee or device sends a request via a badge to the system to perform an unscheduled task at 322. The controller determines at 324 whether the workforce optimization goal can be met if the new task is assigned. If assignment of the new task still allows for the workforce optimization goal to be met, then permission is granted to perform the task at 326. Otherwise, an alternative means is suggested to accomplish the newly requested task.

Figure 4:
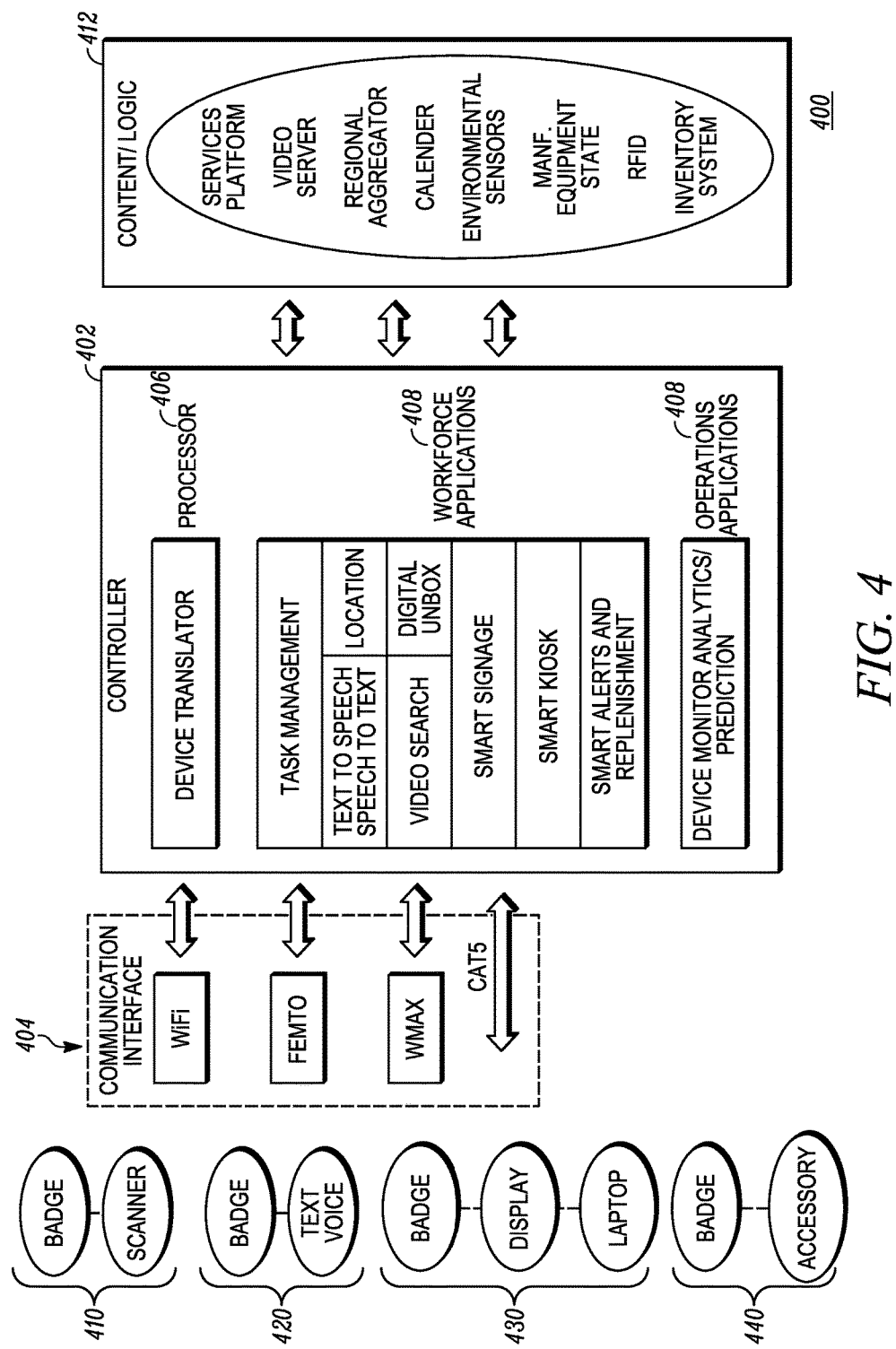
FIG. 4 is a more detailed example of the workforce management communication system of FIG. 2 in accordance with an embodiment of the invention.

FIG. 4 is an example of a block diagram of a more detailed communication system 400 for workforce management in accordance with an embodiment of the invention. Communication system 400 has been provided for illustrative purposes to show how different devices, applications and content/logic platforms can be used within the workforce management embodiments of the invention. System controller 402 communicates with a plurality of workplace devices 410, 420, 430, 440, each workplace device comprises at least one electronic or non-electronic device having a badge associated therewith. The badges may be mobile badges or fixed-location badges. For this example, workplace devices 410, 420, 430, 440 include a scanner, a text/voice device, a laptop having a display, and an alternative accessory, each having a badge associated therewith, such as the badges previously described. The alternative accessory is shown to represent additional workplace devices such as additional scanners, text/voice devices, laptops, etc. within the workplace which may or may not be in current use by other employees. Controller 402 communicates with each device via communication interface 404 embodied, for the purposes of this example, by one or more interfaces, such as WiFi, GSM, Bluetooth, CDMA, WiMAX, and/or CAT5. A processor 406 includes a translator function which translates and interprets inputs such as requests and status reports generated by workplace devices 410, 420, 430, 440. Controller 402 also includes applications 408 are shown embodied by a variety of workforce and operations applications including task management applications, location determination applications, text-to-speech/ speech-to-text conversion applications, video search applications, smart signage applications, smart kiosk applications, smart alert applications, and device monitoring analytics and prediction applications to name a few. The device translator and variety of applications are utilized by the controller 402 to monitor and manage the wide variety of device types based on the number or type of tasks assigned to the devices amongst one or more employees as well as to monitor resource consumption of the devices and the impact the consumption has to overall operation goals and to determine what functions should be executed. To this end, the controller 402 utilizes the analytic and prediction applications to calculate and store in a memory (not shown) an estimated resource status pertaining to for example, the scanner. The controller updates the estimated resource status based, at least in part, on the resource-status reports received from the badge associated with the scanner.

Allowing the system controller 402 to determine what functions should be executed as well allowing the controller 402 to know the resource consumption for each device allows the employee utilizing the electronic device to complete a day's activities in an efficient manner. Also included within communication system 400 is a content logic block 412 which can embody for example, service platforms, a video server and/or a regional aggregator, calendar, environmental sensors, manufacturing equipment states, RFID, inventory systems to name a few. The content/logic 412 is used to update the controller 402 with the various applications 408 through the addition of new applications, removal of old or unused applications, and current employee and device assignment updates. Thus, the controller 402 can be maintained up to date with the current workforce environment. Downloads of task lists may be made to the workforce and operations applications 408 from the content logic 412 in accordance with the type of workforce environment. For example daily or weekly task downloads may be sufficient in some work environments where employees and tasks are maintained over predetermined work schedules, while other environments may require more frequent downloads. The communication system 400 is thus able to be modified in accordance with current workplace conditions and requirements via content/logic 412 while permitting unscheduled tasks caused by unexpected events to be performed. Unexpected events might include, for example, mechanical equipment failure, weather conditions, damage to inventory, and customer purchases. Thus, system 400 is dynamically updated in accordance with real-time workplace events.

Figure 5:
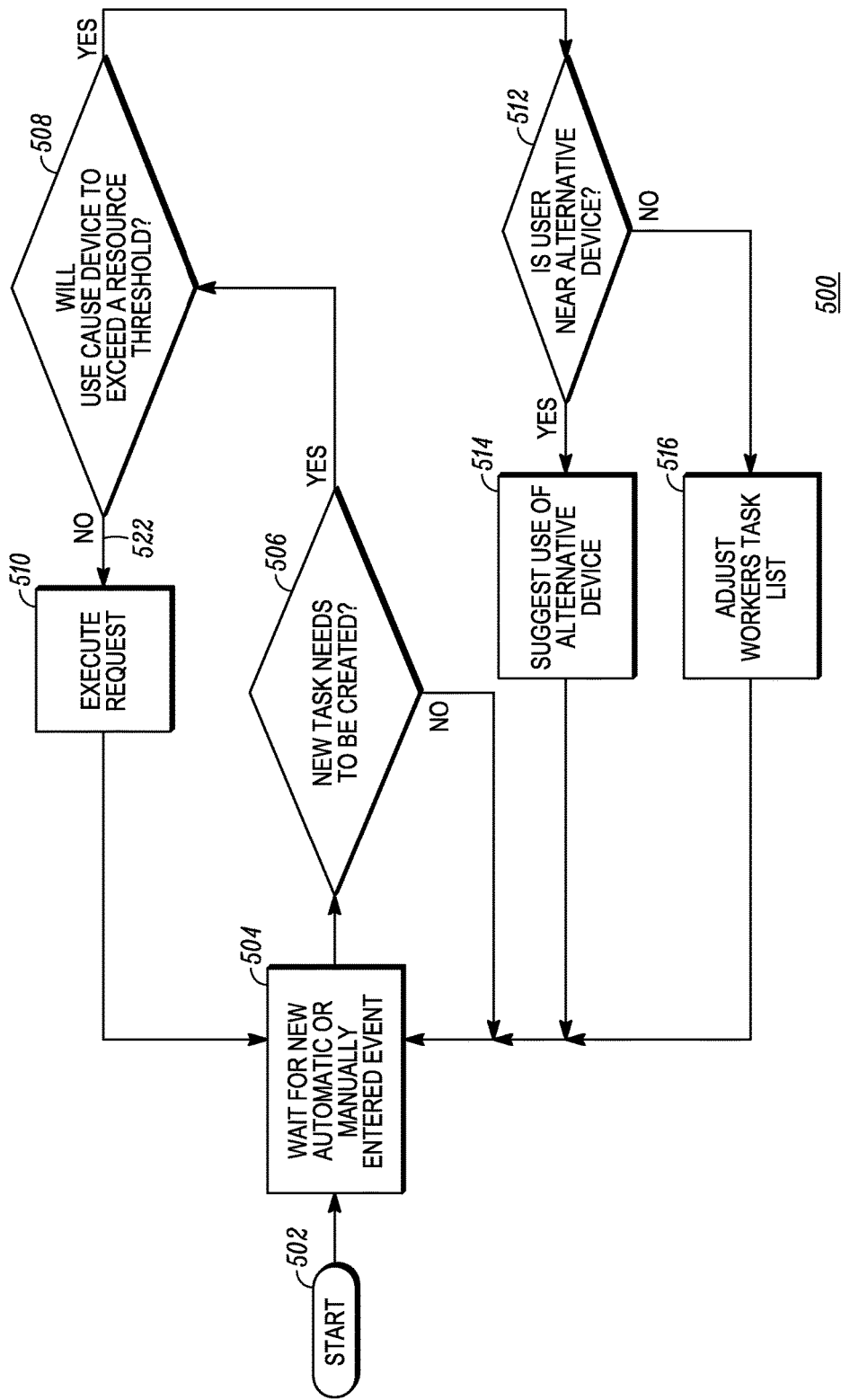
FIG. 5 is another example of the resource management technique used within the workforce management communication system in accordance with an embodiment of the invention.

FIG. 5 is another example of the resource management technique used within the workforce management communication system in accordance with an embodiment of the invention. Technique 500 begins at 502 by waiting for an event to occur. The event may come in the form of a new automated alert from a device, a manually entered task request, or resource status report. For example, a visual alert event could be a light on a badge being detected by a camera within the workplace operating in accordance with a video application. An audible alert generated from one of the badges being detected by audio equipment operating in accordance with audio applications would be another event example. The system controller requesting and receiving battery status reports of a device, and the controller determining that a current drain consumption threshold has or will be exceeded is another example of an event occurrence. The controller requesting and receiving ink status reports from a copier, and the controller determining that the ink consumption threshold has or will be exceeded is another example of an event occurrence.

In response to an event occurrence at 504, a determination is made at 506 as to whether a new task needs to be created. If a badge sends a request to use a particular device or if the system controller interprets that an action is required to address a status report issue or alert, the method continues to 508 to determine whether usage of the device will cause the device to exceed a predetermined resource threshold of the device or prevent system optimization goals from being achieved. If the device threshold and system goals will not be compromised at 508, then the request is executed at 510, and the technique returns back to 504 to wait for another event. If however, the resource threshold or system goals will be negatively impacted, as determined at 508, then alternative devices with appropriate resources are checked for availability and location relative to the user at 512. If an alternative device is available and is nearby, the controller will send a command to the badge to provide an indication to the user that an alternate nearby resource is available at 514. If no suitable device is determined to be available at 512, then the worker's task may be adjusted accordingly at 516. For example, the worker can be reassigned to a different task that utilizes a different type of device. The system controller handles all major processing and analytical functions while the badges are used as alert indicators to the users and to the controller. A user may however, opt to override suggestions made by the controller. For example if the controller instructs a badge not to perform a user requested function, and the user still decides to execute the function, the task list of the user will be readjusted accordingly.

As a practical example of FIGS. 4 and 5, in response to a status report review at 506, a counter-command might be sent by the system controller 402 to disable the scanner of workplace device 410. The counter command might also instruct the user to move to a specified location and accomplish the scanning task using a second scanner, represented here by workplace accessory 430. As another alternative, the controller 402 may instruct another employee to complete the task using their device. The counter-command could also disable the first scanner 410 to prevent further battery life usage. Any number of workplace tasks and devices can thus be managed in an efficient manner.

The workforce management communication systems and techniques formed and operating in accordance with the various embodiments can also expand to incorporate additional non-badge workplace devices operating within the workplace. Non-badge workplace devices might include, for example, phone, door sensor, and laptops. Thus, some workplace devices may have badges while others do not. The system controller receiving event indicators from a badge-associated workplace device can convey the event to the non-badge workplace device. Thus, workforce management, including task assignments and device functionality, can be applied to both badge and non-badge associated devices within the workplace.

Accordingly, the workforce management system and technique operating in accordance with the various embodiments provides improved workplace performance by optimizing device usage and employee task assignments. Dynamic monitoring by the system controller of alerts, requests and status reports from badges associated with workplace devices allows for modification of device usage in conjunction with worker task assignments within the workplace thereby providing optimized workforce management.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method for management of electronic workplace devices in a workforce environment, comprising:
assigning, by a system controller, permissions to a first electronic badge to control a first electronic workplace device without human intervention and provide a first resource status report for the first electronic workplace device to the system controller;
assigning, by the system controller, permissions to a second electronic badge to control a second electronic workplace device without human intervention and provide a second resource status report for the second electronic workplace device to the system controller;
receiving, at the system controller, the first resource status report from the first electronic badge in the workforce environment and the second resource status report from the second electronic badge in the workforce environment, each of the first electronic badge and the second electronic badge comprising one or more of a sensor and an input device, the sensor configured to determine one or more of a state of the respective electronic workplace device and an environment of the respective electronic workplace device, the input device configured to receive data associated with one or more of the state of the respective electronic workplace device and the environment of the respective electronic workplace device;
receiving, at the system controller, one or more of a badge sensor alert and a request from the first badge, the one or more of the badge sensor alert and the request based on the permissions, sensor data and input device data received at the first badge;
generating, at the system controller, a first task associated with the first electronic workplace device based on one or more of the badge sensor alert and the request;
in response to determining that implementation of the first task will cause resource usage at the first electronic workplace device to stay below a resource threshold, sending, by the system controller, a first command to the first badge to cause the first electronic workplace device to execute the first task; and
in response to determining that implementation of the first task will cause the resource usage at the first electronic workplace device to exceed the resource threshold,
sending, by the system controller, a second command to the first badge to cause the first badge to provide a first indication that the second electronic workplace device is available when the second electronic workplace device is within a predetermined proximity to the first electronic workplace device and when the second electronic workplace device includes a predetermined set of resources, and
adjusting, by the system controller, the first task and sending, by the system controller, a third command to the first badge to cause the first badge to provide a second indication associated with the adjusting of the first task when the second electronic workplace device is not within the predetermined proximity to the first electronic workplace device or when the second electronic workplace device does not include the predetermined set of resources,
the determination of at least one of being within the predetermined proximity and including the predetermined set of resources being based on the resource status report of the first electronic workplace device and the resource status report of the second electronic workplace device,
wherein the badge sensor alert at the first badge is detectable by an external sensor disposed in the workforce environment.
2. The method of claim 1, further comprising:
in response to determining that one or more of: performing the first task will inhibit predetermined workplace performance goals, and that implementation of the first task will cause the resource usage at the respective device to exceed the resource threshold, disabling, by the system controller, the first workplace device associated with the first badge; and reassigning, by the system controller, the first task to the second badge associated with the second workplace device in response to determining that the first task should be created but not performed by the first workplace device.

3. The method of claim 1, further comprising in response to determining that the first task should not be created:
   reassigning a user of the first workplace device to a different location.

4. The method of claim 1 further comprising in response to determining that the task should not be created:
   adjusting the first task to a new task.

5. The method of claim 1, further comprising:
   determining whether performing the first task by the first workplace device will inhibit achieving predetermined workplace performance goals; and
   in response to determining that the predetermined workplace performance goals will be inhibited, performing at least one of:
   reassigning the first task to the second badge associated with a second workplace device; and
   disabling the first workplace device.

6. The method of claim 1, wherein receiving one or more of the badge sensor alert and the request comprises one or more of:
   providing indicator alerts at the first badge; and
   sending resource status reports from the first badge; and
   interpreting, at the system controller, the indicator alerts, resource status reports, and requests.

7. The method of claim 1, wherein the resource status report is selected from the group consisting of: a battery-status, an ink-status, temperature status, humidity status, noise status, pollution status, motion status, RF noise, energy usage.

8. The method of claim 1, wherein the resource status report is received in response to a request by the system controller.

9. The method of claim 1, further comprising:
   calculating and storing, at the system controller, an estimated resource status for the first workplace device associated with the first badge;
   updating the estimated resource status at the system controller based, at least in part, on the resource status report received from the first badge; and
   determining, based at least in part on the estimated resource status for the first device, whether the task should be created for the first workplace device associated with the first badge.

10. The method of claim 9, wherein sending the command to the first badge is based, at least in part, on the estimated resource status of the first badge.

11. The method of claim 1, wherein generating the first task is based, at least in part, on workforce management and operations applications within the controller.

12. The method of claim 1, further comprising:
   determining, by the system controller, workplace device efficiency and user efficiency; and
   assigning and re-assigning tasks based on at least one of the determined workplace device efficiency and user efficiency.

13. The method of claim 1, further comprising:
   operating a plurality of non-badge workplace devices within the workplace;
   receiving, at the system controller, an event indicator from at least one badge of the plurality of badges; and
   conveying the event indicator to at least one of the non-badge workplace devices.

14. The method of claim 13, further comprising:
   receiving, at the system controller, an event indicator from at least one non-badge workplace device; and
   conveying the event indicator from the at least one non-badge workplace device to at least one badge associated with a workplace device.

15. The method of claim 1, wherein receiving, at the system controller, one or more of the badge sensor alert and the request comprises:
   receiving, at the system controller, requests for workplace device changes and task changes from the first badge; and
   interpreting, at the system controller, the requests for the workplace device changes and the task changes.

16. The method of claim 1, further comprising:
   executing the task by the first workplace device.

17. A system for managing electronic workplace devices comprising:
   a first electronic workplace device associated with a first electronic badge;
   a second electronic workplace device associated with a second electronic badge;
   each of the first and second electronic badges comprising one or more of a sensor and an input device and configured to determine one or more of a state and an environment of the respectively associated electronic workplace device; and
   a system controller configured to assign permissions to each of the first and second electronic badges and to receive a notice from each of the first and second electronic badges, the notice based on one or more of the permissions, the state, and the environment of the respectively associated electronic workplace device,
   wherein the system controller is further configured to generate, based on the notice, a first task associated with the first electronic workplace device, determine whether resource usage required by the first task at the first electronic workplace device exceeds a resource threshold, and, in response to a determination of not exceeding the threshold, send a first command to the first electronic badge to cause the first electronic device to execute the first task, and
   wherein the system controller is further configured to, in response to a determination of exceeding the threshold, send a second command to the first badge to cause the first badge to provide a first indication that the second electronic workplace device is available when the second electronic workplace device is within a predetermined proximity to the first electronic workplace device and when the second electronic workplace device includes a predetermined set of resources, and
   adjust the first task and send a third command to the first badge to cause the first badge to provide a second indication associated with the adjusting of the first task when the second electronic workplace device is not within the predetermined proximity to the first electronic workplace device or when the second electronic workplace device does not include the predetermined set of resources, the determination of at least one of being within the predetermined proximity and including the predetermined set of resources being based on a resource status report of the first electronic workplace device and a resource status report of the second electronic workplace device.

18. The system of claim 17 wherein the notice is at least one of a badge sensor alert and a request.

* * * * *